16 3,213,093
PHOSPHINO-s-TRIAZINES
Grace Peters Papp and Sheldon A. Buckler, Stamford,
Conn., assignors to American Cyanamid Company,
Stamford, Conn., a corporation of Maine
No Drawing. Filed Dec. 12, 1963, Ser. No. 329,964
6 Claims. (Cl. 260—249.8)

The present invention relates to monosubstituted phosphino-s-triazines, disubstituted phosphino-s-triazines, and their oxides. More particularly, the instant discovery concerns a novel method for preparing a novel class of compounds which comprises reacting an alkali metal salt of an organic phosphine with a substituted or unsubstituted chloro-s-triazine in an appropriate solvent. The following equation is generic:

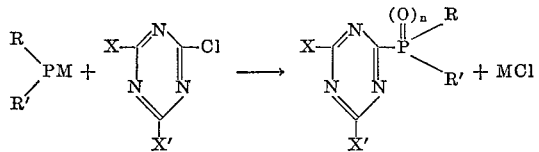

wherein R and R' each represent alkyl ($C_1$–$C_8$), cyclopentyl, cyclohexyl, phenyl, lower alkyl-substituted phenyl, H and naphthyl; X and X' each represent chloro, bromo, lower alkyl, phenyl, amino, mono- and di-alkyl ($C_1$–$C_{12}$)-substituted amino and mono-cyclohexylamine;

M is alkali metal, i.e., Na, K, Li; and $n$ is selected from 0 and 1.

Preferably, an inert organic solvent is employed. Typical solvents are cyclic ethers, such as dioxane, tetrahydrofuran (THF), and the like, non-cyclic ethers, such as diethyl ether, dibutyl ether, and other solvents which under the conditions of the reaction to be described, infra, will not react to any substantial degree with the reactants or the desired reaction products. Acetonitrile is another typical solvent.

Reaction is best carried out at a temperature in the range of 0° C. to 150° C., preferably 20° C. to 90° C. or at the reflux temperature of the solvent employed. While equimolar amounts of the reactants are generally employed, an excess of either reactant with respect to the other may be present.

Generally the oxide product described in the generic formula hereinabove results when the reactants and/or products thereof are exposed to air or oxygen during the reaction, during isolation of the reaction products or subsequent to recovery of the desired reaction product.

The novel products of the present invention are flameproofing agents. For example, cotton fabric, such as cotton cloth, dipped into a suitable solvent containing up to about 10% by weight of any one of the novel compounds prepared herein exhibit, upon drying, very desirable resistance to flaming when contacted with an open flame.

The present invention will best be understood from the following examples which are intended to be illustrative and not to unduly limit the scope of the present invention, excepting of course as such limitations appear in the appended claims.

EXAMPLE I

2-[4,6-bis-(dimethylamino)-s-triazinyl]-diphenylphosphine oxide

A slurry of sodium diphenylphosphide in dioxane is prepared from 5.5 grams (0.025 mole) of diphenylchlorophosphine by refluxing 4 hours with excess sodium (2.4 grams, 0.1 mole) in 50 cubic centimeters of dry dioxane. Upon cooling, excess sodium is removed, the product remaining as a yellow solid, together with by-product NaCl. To this slurry, 4.4 grams (0.022 mole) of 2-chloro-4,6-bis(dimethylamino)-s-triazine is added, together with 15 cubic centimeters of dioxane. The temperature rises from 25° C. to 33° C. as the yellow color is discharged. After 3.5 hours at reflux, the resulting mixture is cooled and filtered using Hyflo. Concentration of the filtrate under reduced pressure leaves a solid weighing 4.5 grams after a wash with hexane and having a melting point of 145° C.–163° C. Recrystallization from 50% aqueous methanol and then aqueous acetone gives long needles having a melting point of 168° C.–171° C. Extraction of the inorganic salts with boiling methanol gives 2.1 grams of soluble solids from which 0.4 gram of additional product is obtained by recrystallization from aqueous methanol and further precipitation with water. Initial analysis indicates the product is slowly oxidizing to the phosphine oxide, so subsequently a portion of the original crude product is treated with an equivalent amount of 30% $H_2O_2$ in methanol, heated at reflux for 3 hours and then diluted with water. The precipitated product has a melting point of 171° C.–173° C. from aqueous methanol and analyzes correctly for 2-[4,6-bis(dimethylamino)-s-triazinyl]-diphenylphosphine oxide.

EXAMPLE II 2,4-bis(dimethylamino)-6-dicyclohexylphosphino-s-triazine

Dicyclohexyl lithium phosphide is prepared by adding 10 grams (0.05 mole) of dicyclohexylphosphine in 20 cubic centimeters of ether to a solution of phenyl lithium (0.1 mole) in 75 cubic centimeters of ether following the methods of Issleib and Tzschach, Berichte, 92, 1124 (1959). (Phenyl lithium is prepared from 15.7 grams (0.1 mole) of bromobenzene and 1.5 grams (0.22 gram atom) of lithium in 75 cubic centimeters of ether.) A solid yellow phosphide separates within 25 minutes. To this slurry 10 grams (0.05 mole) of 2-chloro-4,6-bis(dimethylamino)-s-triazine in 50 cubic centimeters of dioxane is added at 25° C. The resulting mixture is stirred 1 hour and allowed to stand overnight. Filtration gives 22.4 grams of solid, from which 1.0 gram of product is obtained by extracting with benzene, evaporating and triturating with ethanol. Evaporation of the dioxane-ether filtrate leaves 15 grams of brown smeary residue. After various attempts to induce crystallization, 12.6 grams of material extracted by petroleum ether is dissolved in a minimum of $CH_3CN$ to obtain another 1.0 gram of product, melting point 72° C.–75° C. Recrystallization from aqueous isopropanol gives 2,4-bis(dimethylamino) - 6 - dicyclohexylphosphino - s - triazine, melting point 77° C.–78° C. which analyzes as follows:

Calculated for $N_5PC_{19}H_{34}$: C, 62.78; H, 9.43; N, 19.27; P, 8.52. Found: C, 62.70; H, 9.14; N, 19.29; P, 8.40.

EXAMPLES III–XIII

The following Table I further illustrates the present invention, each example therein being carried out essentially as in Example I or II, above, excepting as indicated;

TABLE I (A) $\underset{R'}{\overset{R}{>}}PM$ + (B) [chloro-triazine structure] → (C) [product structure] + MCl

| Example No. | R | R' | M | X | X' | Solvent | Temp., °C. | Reaction as in Example No. | n | |
|---|---|---|---|---|---|---|---|---|---|---|
| III | Ethyl | Ethyl | K | Br | Br | Dioxane | 20 | I | 1 | |
| IV | Propyl | H | K | Cl | Ethyl | THF* | 20 | II | 0 | |
| V | Hexyl | Hexyl | Li | Methyl | Methyl | Diethyl ether | 25 | II | 0 | |
| VI | Octyl | Butyl | Na | Phenyl | Cl | Dioxane | 25 | I | 1 | |
| VII | H | Methyl | K | Ethyl | Ethyl | do | 25 | I | 1 | |
| VIII | Phenyl | H | Na | Cl | —NH$_2$ | Dibutyl ether | 30 | I | 1 | |
| IX | Cyclohexyl | Cyclohexyl | Na | —N(C$_2$H$_5$)$_2$ | —NH$_2$ | THF* | 25 | II | 0 | |
| X | Xylyl | H | Li | —NH$_2$ | —N(C$_8$H$_{17}$)$_2$ | THF* | 30 | II | 0 | [X, X', R, R', and M, above, have the same meanings given them under reactant formulae (A) and (B) in this table]. |
| XI | Naphthyl | H | K | —N(C$_{12}$H$_{25}$)H | —N(H)(C$_3$H$_7$) | THF* | 25 | I | 1 | |
| XII | Tolyl | Tolyl | Na | Cl | Cl | Dibutyl ether | 110 | II | 0 | |
| XIII | H | Cyclopentyl | Na | —N(cyclohexyl)H | —NH$_2$ | Diethyl ether | 30 | II | 0 | |

*Tetrahydrofuran.

It has been further found, pursuant to the present invention, that a chloro-s-triazine reactant of the type contemplated herein reacts with an alkylene bis(phenyllithiumphosphide), under the conditions given hereinabove, to yield interesting bridged products having the same uses ascribed to the product phosphino-s-triazines hereinabove described. The reaction may be described generically as follows:

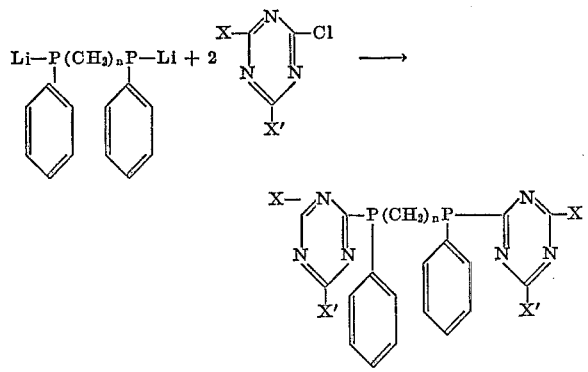

wherein X and X' have the same meanings given hereinabove and n is a value from 2 to 6.

As is evident from this reaction, 2 moles of the chloro-s-triazine reactant react with the phenyllithium phosphide reactant to form the desired product. This reaction will best be understood from the examples which follow:

EXAMPLE XIV

*Ethylenebis[[4,6-bis(dimethylamino)-s-triazin-2-yl]phenylphosphine oxide]*

A solution of 0.05 molar ethylenebis(phenyllithiumphosphide) in dioxane is prepared according to the method of Issleib and Krech (Berichte 94, p. 2656, 1961). This is then reacted with 10 grams (0.1 mole) of 2-chloro-4,6-bis(dimethylamino)-s-triazine as in Example I, above. Conversion of the resulting product to its corresponding oxide is completed by treatment with an equivalent of 30% H$_2$O$_2$ in methanol, also as in Example I, above, the product recovered being ethylenebis[[4,6-bis(dimethylamino)-s-triazin-2-yl]phenylphosphine oxide].

EXAMPLE XV

*2,2'-[tetramethylenebis(phenylphosphinidene)]bis[4,6-(diamino)-s-triazine]*

The reaction of 0.1 molar tetramethylene bis(phenyllithiumphosphide) with 0.2 mole (21.9 grams) of 2-chloro-4,6-diamino-s-triazine is carried out as in Example XIV, above, except for oxidation with H$_2$O$_2$. The product obtained is recrystallized from methanol to obtain 2,2'-[tetramethylenebis(phenylphosphinidene)]bis[4,6 - (diamino)-s-triazine].

The reaction of Example XIV can be repeated in every essential respect using the triazine

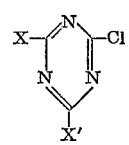

reactants described hereinabove, e.g., those of Examples IX, XI, XIII, etc., to yield the corresponding bridged diphosphine products of the Formula D above.

We claim:
1. A compound of the formula

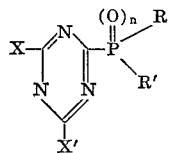

wherein R and R' each represent a member selected from the group consisting of alkyl($C_1$–$C_8$), cyclopentyl, cyclohexyl, phenyl, lower alkyl-substituted phenyl, naphthyl and H; X and X' each represent a member selected from the group consisting of chloro, bromo, lower alkyl, phenyl, amino, mono- and di-alkyl ($C_1$–$C_{12}$)-substituted amino and mono-cyclohexylamine; and $n$ is selected from 0 and 1.

2. 2 - [4,6 - bis(dimethylamino)-s-triazinyl] - diphenylphosphine oxide.

3. 2,4-bis(dimethylamino) - 6 - dicyclohexylphosphino-s-triazine.

4. A compound of the formula

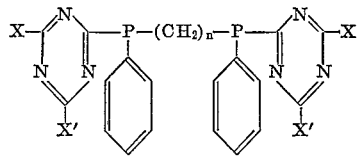

wherein X and X' each represent a member selected from the group consisting of chloro, bromo, lower alkyl, phenyl, amino, mono- and di-alkyl ($C_1$–$C_{12}$)-substituted amino and mono-cyclohexylamine, and $n$ is a value from 2 to 6.

5. Ethylenebis[[4,6 - bis(dimethylamino)-s-triazin - 2-yl]phenylphosphine oxide].

6. 2,2' - [tetramethylenebis(phenylphosphinidene)]bis[4,6-diamino-s-triazine].

References Cited by the Examiner
UNITED STATES PATENTS
2,685,581  8/54  Coover _____ 260—248
3,064,055  11/62  Herring _____ 260—461

OTHER REFERENCES
Kosolapoff: "Organophosphorus Compounds," John Wiley and Sons, Inc., New York (1950), page 13.

Van Wazer: Phosphorus and Its Compounds, volume 1, "Chemistry," Interscience Publishers, Inc., New York, 1958, page 123.

WALTER A. MODANCE, *Primary Examiner.*
NICHOLAS S. RIZZO, *Examiner.*